US008111711B2

(12) United States Patent
Li et al.

(10) Patent No.: US 8,111,711 B2
(45) Date of Patent: Feb. 7, 2012

(54) MULTI-CHANNEL RANGING FOR A CABLE MODEM

(75) Inventors: DeFu Li, Boxborough, MA (US); Pawel Sowinski, Boxborough, MA (US); Robert Goguen, Boxborough, MA (US); Tong Liu, Boxborough, MA (US); Alon Bernstein, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 509 days.

(21) Appl. No.: 12/334,392

(22) Filed: Dec. 12, 2008

(65) Prior Publication Data
US 2010/0154016 A1  Jun. 17, 2010

(51) Int. Cl.
*H04L 7/04* (2006.01)
(52) U.S. Cl. .......................... 370/449; 370/468; 725/111
(58) Field of Classification Search .................. 370/464, 370/465, 468, 431, 449; 725/111
See application file for complete search history.

(56) References Cited

U.S. PATENT DOCUMENTS

| 6,742,186 | B1 * | 5/2004 | Roeck | 725/111 |
| 7,017,176 | B1 * | 3/2006 | Lee et al. | 725/111 |
| 2006/0126660 | A1 * | 6/2006 | Denney et al. | 370/468 |
| 2006/0271988 | A1 * | 11/2006 | Chapman et al. | 725/111 |
| 2009/0125959 | A1 * | 5/2009 | Oh et al. | 725/111 |

OTHER PUBLICATIONS

CABLELABS, Data-Over-Cable Service Interface Specifications DOCSIS 3.0 Security Specification, c. 2006-2007, Cable Television Laboratories, Inc., http://cablemodem.com/specifications/specifications30.html.

* cited by examiner

*Primary Examiner* — Hassan Kizou
*Assistant Examiner* — Siming Liu
(74) *Attorney, Agent, or Firm* — Stolowitz Ford Cowger LLP

(57) ABSTRACT

In one example, a Cable Modem Termination System (CMTS) sends first bandwidth allocation messages to a first upstream transmit interface on a cable modem and send second bandwidth allocation messages to a second upstream transmit interface on the cable modem. The bandwidth allocation messages indicate transmit windows for the cable modem to range over the interfaces. The transmit windows included in the first bandwidth allocation messages are spaced based on receipt of ranging requests from the second upstream transmit interface, and the transmit windows included in the second bandwidth allocation messages are spaced based on receipt of ranging requests from the first upstream transmit interface.

22 Claims, 3 Drawing Sheets

US 8,111,711 B2

MULTI-CHANNEL RANGING FOR A CABLE MODEM

TECHNICAL FIELD

The present disclosure relates generally to the field of cable networks.

BACKGROUND

Cable operators have widely deployed high-speed data services on cable television systems. These data services allow subscriber-side devices, such as personal computers, to communicate over an ordinary cable TV network Hybrid Fiber Coax (HFC) cable. A Cable Modem Termination System (CMTS) connects the cable TV network to a data network, such as the Internet. The Data Over Cable Service Interface Specification (DOCSIS) is one of the cable modem standards used for transferring data over the cable TV network.

To ensure reachability between the CMTS and its cable modems, ranging transactions are frequently performed. Ranging allows the cable modem to fine-tune its physical upstream transmission parameters to better adapt to gradual changes that could lead to channel impairment, and thus remain reachable by the CMTS. Successful ranging involves the CMTS sending a message to define a transmission window for the cable modem to send a ranging request, the cable modem sending the ranging request during the transmission window, and the CMTS responding back with a ranging response.

If the cable modem does not send the ranging request during the transmit window, the CMTS provides another transmit window. If this process repeats too many times (typically sixteen), the CMTS marks the cable modem offline and cleans up resources so that these resources can be available for other cable modems.

When a cable modem is operating in Multiple Transmit Channel (MTC) mode, the cable modem periodically ranges on more than one active upstream transmit channel. If these ranging transactions are performed as frequently on a per-channel basis as a cable modem operating in non-MTC mode, the CMTS can become over-utilized. The disclosure that follows solves this and other problems.

DYNAMIC EQAM DISCOVERY IN M-CMTS ARCHITECTURE

Description of Example Embodiments

Overview

In one example, a Cable Modem Termination System (CMTS) sends first bandwidth allocation messages to a first upstream transmit interface on a cable modem and sends second bandwidth allocation messages to a second upstream transmit interface on the cable modem. The bandwidth allocation messages indicate transmit windows for the cable modem to range over the interfaces. The transmit windows included in the first bandwidth allocation messages are spaced based on receipt of ranging requests from the second upstream transmit interface, and the transmit windows included in the second bandwidth allocation messages are spaced based on receipt of ranging requests from the first upstream transmit interface.

DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
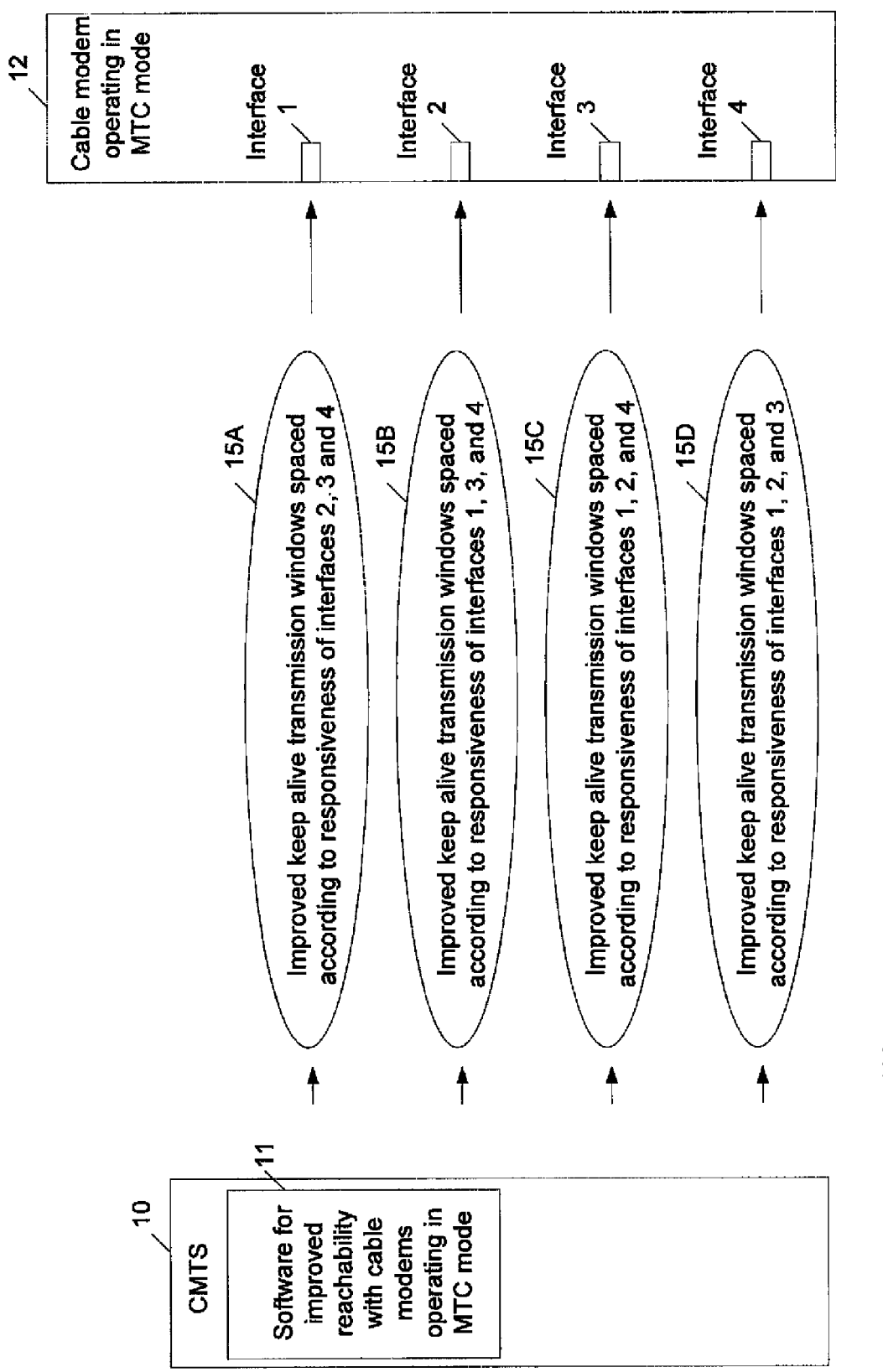
FIG. 1 illustrates one example of a system providing improved ranging for a multi transmit channel cable modem.

FIG. 1 illustrates one example of a system providing improved ranging for a multi transmit channel cable modem.

The example system 100 includes a Cable Modem Termination System (CMTS) configured with software 11. The software 11 is configured to intelligently space the provisioning of keep alive transmission windows for each active interface 1-4 based on observed responsiveness of the other interfaces 1-4 for cable modem 12. This and other operations of the software 11 are compatible with existing cable modems, meaning that the improved ranging can be realized without reconfiguring existing cable modems. The following paragraphs will discuss with reference to FIG. 1 how the software 11 improves the performance of a cable network, including performance of the CMTS and the cable modems. A more detailed example operation of the software 11 will be provided later with reference to FIG. 2.

Referring still to FIG. 1, as discussed previously the cable network can operate with both Multi Transmit Channel (MTC) and non-MTC modems. For non-MTC modems, the CMTS 10 sends Bandwidth Allocation Map (hereinafter "MAP") messages downstream with the Service IDentifier (SID) of the cable modem. The MAP messages provide evenly spaced ranging opportunities, which allow a ranging request at every occurrence of a periodic interval.

As a CMTS can become overburdened by processing ranging transactions, it is preferable to perform less ranging transactions on a per-channel basis for MTC mode than non-MTC mode. Partial solutions introduce a multiplier to extend the ranging interval and making the evenly spaced ranging opportunities less frequent. However, by simply providing the ranging channel less often on a per-channel basis these partial solutions treat ranging on each channel as an independent state machine mimic operation of a single channel.

In contrast to these existing partial solutions, the software 11 spaces ranging opportunities provided to each interface based on observed responsiveness of the other interfaces. For example, the transmission windows 15A communicated to interface 1 are spaced according to the responsiveness of interfaces 2-4. Similarly, the transmission windows 15B-D communicated to the other interfaces 2-4 are dependent on the observed responsiveness of the interface 1.

In addition to preventing the CMTS from becoming overburdened by ranging transactions, another benefit provided by the software 11 is that non-responsive MTC cable modems can be taken offline earlier, freeing up CMTS resources to be re-allocated to other cable modems. Taking a non-responsive MTC cable modem offline earlier also provides benefits on the cable modem side by allowing the cable modem to restart the registration process, which may resolve the reachability problems.

The software 11 can also preserve network bandwidth and CMTS resources by preventing unnecessary DBC exchanges. A DBC transaction allows a CMTS to change a group of active upstream transmit interfaces after an interface is timed-out. Existing partial solutions, which timeout interfaces one at a time according to the evenly spaced periodic interval, trigger DBC transactions immediately after the observation of each interface timeout. This functionality can lead to a thrashing effect if there is a power outage or some other event that causes numerous MTC cable modems to become unreachable. As the interfaces on each MTC cable modem are timed-out sequentially the resource-consuming DBC transactions begin changing to interfaces that will simply be timed-out seconds later.

Figure 2:
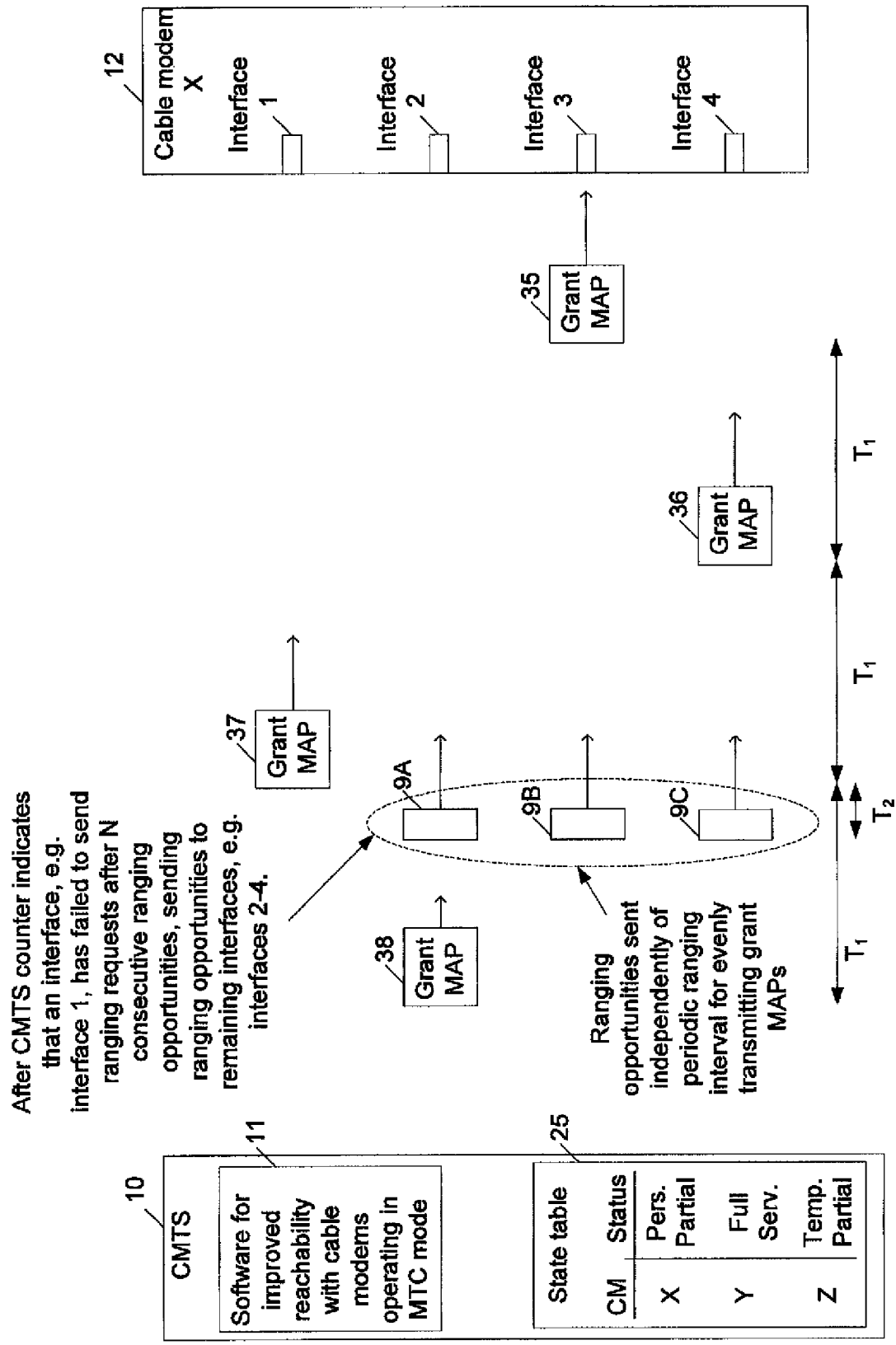
FIG. 2 illustrates an example operation of the CMTS shown in FIG. 1 to illustrate the improved multi-channel ranging.

Having provided an overview of the system 100, a more detailed discussion of the configuration of the software 11 will now be provided with reference to FIG. 2.

FIG. 2 illustrates an example operation of the CMTS shown in FIG. 1 to illustrate the improved multi-channel ranging.

In the present example, the CMTS 10 evenly spaces ranging opportunities every thirty seconds according to a periodic interval. This even spacing is illustrated with reference to the time period $T_1$ in FIG. 2. Thus, the grant map 36 is sent thirty seconds later than the grant map 35, the grant map 37 is send thirty seconds later than the grant map 36, etc.

A counter on the CMTS 10 tracks the number of times a ranging transaction is unsuccessful during a ranging opportunity on a channel-by-channel basis. For example, if the counter reaches sixteen for an interface, then that interface is timed-out.

The software 11 maintains a state table 25 according to the status of the downstream cable modems. For example, the table 25 includes an entry for the cable modem 12 (indicated as cable modem X in the table). For an MTC cable modem ranging successfully on all active channels, the table 25 indicates full service. The illustrated table 25 shows an entry for a cable modem Y, which is currently marked as full service state.

For a cable modem that has failed a ranging opportunity on at least one channel, the cable modem is marked as either a persistent partial state or a temporary partial state. The temporary partial state indicates that the cable modem has failed one or more transactions but that none of its interfaces have timed-out. The persistent partial state indicates that the cable modem has had at least one of its interfaces timed-out for failing a predefined number of consecutive retries. The table 25 can also indicate which interface(s) have timed-out for cable modems in the persistent partial state.

In the present example, the CMTS sends the grant map 37, which fails to elicit a ranging request from the interface 1. For purposes of explanation, it is assumed that this failure causes a timeout, and accordingly, the CMTS 10 updates the table 25 to indicate a persistent partial state for the cable modem 12.

The software 11 monitors the table 25 and, responsive to observing the persistent partial state for cable modem 12, sends ranging opportunities 9A-C to the remaining active interfaces 2-4. These ranging opportunities 9A-C are sent $T_2$ seconds after sending the grant MAP 37. The amount of time $T_2$ can be twenty-five milliseconds, the amount of time the CMTS 10 gives for the cable modem 12 to sending the ranging request for the grant MAP 37. The time $T_2$ can be a different amount of time, but is preferably less than the interval $T_1$ such that the remaining active interfaces 2-4 are polled sooner than the next scheduled grant MAP 38.

The software 11 then monitors a response to these ranging opportunities 9A-C. If all these interfaces 2-4 fail to range, the software 11 marks the cable modem 12 offline regardless of how many, if any, consecutive failures the other interfaces 2-4 have experienced.

The observed failure of all the other interfaces to range in response to the grant MAPs 9A-C, in combination with the observed timeout of interface 1 according to the CMTS counter, indicates a high likelihood that the cable modem 12 has been subjected to a power outage or other event that affects all the interfaces 1-4. As a result, the software 11 causes the CMTS 10 to take the cable modem 12 offline earlier than the next scheduled grant MAP 38. Promptly taking the cable modem 12 offline frees up CMTS resources, allows the cable modem 12 to restart registration, and also prevents DBC operations from thrashing between interfaces that have been downed due to the a power failure or other event affecting the entire cable modem 12. It should be apparent that the cable modem 12 is taken offline much sooner than in conventional systems where a cable networks waits for each interface to successively timeout according to the counter before taking the cable modem offline.

A ranging success on at least one of the interfaces 2-4 in response to their respective grant MAP 9A-C indicates that whatever caused the failure to interface 1 does not affect the entire cable modem 12. In this case, the software 11 times-out the non-responsive interfaces according to the time period $T_1$ and the CMTS counter. For example, if any one of the interfaces 2-4 respond, the CMTS 10 sends the next scheduled grant MAP 38 (regardless of whether interface 2 failed to respond to grant MAP 9A). Also, in this case the CMTS 10 can enter a continuous polling state where retries are sent to the non-responding interface more frequently, for example every second instead of every thirty seconds.

Thus, it should be apparent that the "quick polling" of the remaining interfaces 2-4 quickly detects cases where there is a high probability that the interface 1 timeout is related to a system wide failure such as a power failure. In such a case, the cable modem 12 is immediately marked offline instead of waiting to timeout the remaining interfaces successively.

It should be understood that the software 11 can delay DBC transactions after an interface times-out. Specifically, the software 11 prevents the DBC transaction from occurring immediately and instead waits to observe ranging requests for the grant MAPs 9A-C. If there are no ranging requests for these grant MAPs 9A-C, the software 11 stops the DBC transaction by taking the cable modem 12 offline. If there is at least one ranging request for these grant MAPs 9A-C, the software 11 will allow DBC transactions to initiate depending on system configurations.

In addition to using the tracking table 25 to identify cable modems requiring the quick poll, the software 11 can also use the tracking table 25 to identify potential network wide outages. For example, if a predefined percentage of the entries have changed from the full service state to another state within a predefined time range, the software 11 can infer a likelihood of a system wide outage, such as a power outage affecting many cable modems. The software 11 could then immediately mark affected cable modems offline without performing the quick polling. Alternatively, the software 11 could then perform a quick poll of all cable modems in the temporary partial state in addition to quick polling the cable modems in the persistent partial state as described earlier.

Although the present example utilizes the tracking table 25, it should be apparent that the principles described above can be practiced without utilizing the table 25. For example, the software 11 can monitor for interface timeouts on MTC cable modems and then perform the quick polling to the remaining interfaces without tracking the MTC cable modem in the table 25.

If a tracking table is used, the tracking table may record more or less states than the three discussed above. In one example, the table 25 tracks only two states, a first state for when the cable modem has no timed-out interfaces and a second state for when the cable modem has at least one timed-out interface. The quick poll is sent to cable modems entering the second state.

Figure 3:
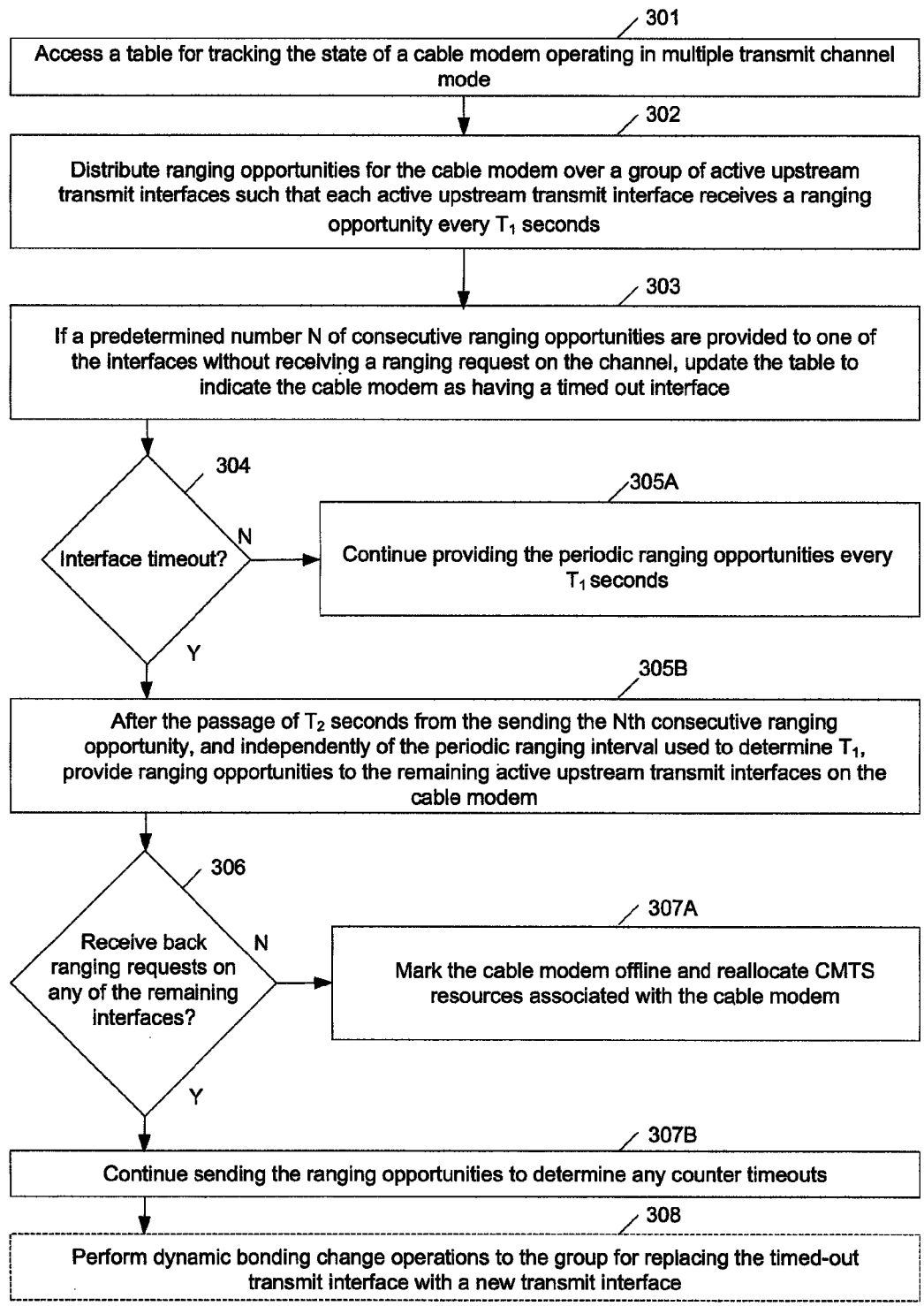
FIG. 3 illustrates how the example CMTS shown in FIGS. 1 and 2 determines when to send a ranging opportunity on each active channel.

FIG. 3 illustrates how the example CMTS shown in FIGS. 1 and 2 determines when to send a ranging opportunity on each active channel.

In block 301, the CMTS 10 accesses a table for tracking the state of a cable modem operating in multiple transmit channel mode. In block 302, the CMTS 10 distributes ranging opportunities for the cable modem over a group of active upstream transmit interfaces such that each active upstream transmit interface receives a ranging opportunity every $T_1$ seconds.

If a predetermined number N of consecutive ranging opportunities are provided to one of the interfaces without receiving a ranging request on the channel, in block 303 the CMTS 10 updates the table to indicate the cable modem as having a timed-out interface. If there is no interface timeout in diamond 304, the CMTS 10 continues providing the ranging opportunities every $T_1$ seconds in block 305A.

If there is an interface timeout in diamond 304, the CMTS 10 provides ranging opportunities to the remaining active upstream transmit interfaces in block 305B. These ranging opportunities are provided $T_2$ seconds after sending the Nth consecutive ranging opportunity, and independently of the periodic ranging interval used to determine the time $T_1$.

If the CMTS 10 observes no ranging requests for the remaining channels in diamond 306, in block 307A the CMTS 10 marks the cable modem offline and reallocates CMTS resources associated with the cable modem. This allows the cable modem to reinitialize its MAC layer interface and re-register with the CMTS 10.

If the CMTS 10 receives back a ranging request on any of the remaining interfaces in diamond 306, in block 307B the CMTS 10 continues sending the ranging opportunities to determine any counter timeouts. After having waited for a response to the quick poll, in block 308 the CMTS 10 can then perform a dynamic bonding change operation to the group for replacing the timed-out interface with a new transmit interface. The block 308 has a dashed line to emphasize that this block may or may not be performed depending on other factors.

Several preferred examples have been described above with reference to the accompanying drawings. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A Cable Modem Termination System (CMTS), comprising:
  circuitry configured to:
    send first bandwidth allocation messages to a first upstream transmit interface on a cable modem, the first bandwidth allocation messages indicating transmit windows for the cable modem to send first ranging requests over the first upstream transmit interface; and
    send second bandwidth allocation messages to a second upstream transmit interface on the cable modem, the second bandwidth allocation messages indicating transmit windows for the cable modem to send second ranging requests over the second upstream transmit interface;
    wherein the transmit windows included in the first bandwidth allocation messages are spaced based on receipt of the second ranging requests from the second upstream transmit interface, and wherein the transmit windows included in the second bandwidth allocation messages are spaced based on receipt of the first ranging requests from the first upstream transmit interface.

2. The CMTS of claim 1, wherein the circuitry is further configured to:
  timeout one of a plurality of upstream transmit interfaces on the cable modem in response to observing a predetermined number of consecutive ranging failures for the timed-out interface; and
  provide the remaining active upstream transmit interfaces on the cable modem with unscheduled ranging opportunities in association with the interface timeout.

3. The CMTS of claim 2, wherein the circuitry is further configured to, if all the remaining active upstream transmit interfaces fail to send ranging requests in response to the unscheduled ranging opportunities, take the cable modem offline prior to timing-out all of the active upstream transmit interfaces.

4. The CMTS of claim 3, wherein the circuitry is further configured to:
  if at least one of the remaining active upstream transmit interfaces sends a ranging request in response to the unscheduled ranging opportunities, control timing-out of all the remaining interfaces according to a timeout counter.

5. The CMTS of claim 4, wherein if at least one of the remaining active upstream transmit interfaces range in response to the unscheduled ranging opportunities, the cable modem is not taken offline until all of the remaining upstream transmit interfaces timeout.

6. The CMTS of claim 1, wherein the circuitry is further configured to:
maintain a state table for tracking a plurality of Multi Transmit Channel (MTC) cable modems;
wherein the state table indicates one of three states for each tracked cable modem, the three states including a full service state, a temporary partial service state, and a persistent partial service state.

7. The CMTS of claim 6, wherein the circuitry is further configured to:
continuously monitor the state table to identify a plurality of cable modems changing from the full service state to one of the partial service states; and
in response to identifying the plurality of state changes, take at least one MTC cable modem offline prior to any timing-out of any interfaces on said MTC cable modem.

8. The CMTS of claim 6, wherein the circuitry is further configured to poll a plurality of upstream transmit interfaces on one of the MTC cable modems in response to said MTC cable modem changing from the temporary partial service state to the persistent partial service state.

9. The CMTS of claim 6, wherein the circuitry is further configured to:
continuously monitor the state table to identify a threshold number of cable modems changing from the full service state to one of the partial service states during a time range; and
poll MTC cable modems indicated as having the temporary partial service state in response to identifying the threshold number of cable modems changing from the full service state to one of the partial service states.

10. The CMTS of claim 1, wherein the circuitry is further configured to:
timeout one of a plurality of upstream transmit interfaces on the cable modem in response to observing a predetermined number of consecutive ranging failures for the timed-out interface;
provide the remaining active upstream transmit interfaces on the cable modem with unscheduled ranging opportunities; and
delay dynamic bonding change operations for the cable modem having the timed-out interface based on a response to the unscheduled ranging opportunities.

11. The CMTS of claim 1, wherein the CMTS is a Modular CMTS (M-CMTS) and the circuitry operates on the M-CMTS core.

12. A method, comprising:
sending first bandwidth allocation messages to a first upstream transmit interface on a cable modem, the first bandwidth allocation messages indicating transmit windows for the cable modem to send first ranging requests over the first upstream transmit interface; and
sending second bandwidth allocation messages to a second upstream transmit interface on the cable modem, the second bandwidth allocation messages indicating transmit windows for the cable modem to send second ranging requests over the second upstream transmit interface;
wherein the transmit windows included in the first bandwidth allocation messages are spaced based on receipt of the second ranging requests from the second upstream transmit interface, and wherein the transmit windows included in the second bandwidth allocation messages are spaced based on receipt of the first ranging requests from the first upstream transmit interface.

13. The method of claim 12, further comprising:
timing-out one of a plurality of upstream transmit interfaces on the cable modem in response to observing a predetermined number of consecutive ranging failures for the timed-out interface; and
providing the remaining active upstream transmit interfaces on the cable modem with unscheduled ranging opportunities in association with the interface timeout.

14. The method of claim 13, further comprising, if all the remaining active upstream transmit interfaces fail to send ranging requests in response to the unscheduled ranging opportunities, taking the cable modem offline prior to timing-out all of the active upstream transmit interfaces.

15. The method of claim 14, further comprising:
if at least one of the remaining active upstream transmit interfaces sends a ranging request in response to the unscheduled ranging opportunities, controlling timing-out of all the remaining interfaces according to a timeout counter.

16. The method of claim 12, further comprising:
maintaining a state table for tracking a plurality of Multi Transmit Channel (MTC) cable modems;
wherein the state table indicates cable modems that have failed a ranging opportunity.

17. The method of claim 16, further comprising:
continuously monitoring the state table to identify a plurality of cable modems failing ranging opportunities; and
in response to identifying the plurality of cable modems, taking at least one MTC cable modem offline prior to any timing-out of any interfaces on said MTC cable modem.

18. The method of claim 16, further comprising:
continuously monitoring the state table to identify a threshold number of cable modems failing a ranging opportunity during a time range; and
polling MTC cable modems indicated as having failed a ranging opportunity in response to identifying the threshold number of cable modems failing a ranging opportunity during the time range.

19. The method of claim 12, further comprising:
timing-out one of a plurality of upstream transmit interfaces on the cable modem in response to observing a predetermined number of consecutive ranging failures for the timed-out interface;
providing the remaining active upstream transmit interfaces on the cable modem with unscheduled ranging opportunities; and
delaying dynamic bonding change operations for the cable modem having the timed-out interface until observing a response to the unscheduled ranging opportunities.

20. A memory device having instructions stored thereon that, in response to execution by a processing device, causes the processing device to perform operations comprising:
sending first bandwidth allocation messages to a first upstream transmit interface on a cable modem, the first bandwidth allocation messages indicating transmit windows for the cable modem to send first ranging requests over the first upstream transmit interface; and
sending second bandwidth allocation messages to a second upstream transmit interface on the cable modem, the second bandwidth allocation messages indicating transmit windows for the cable modem to send second ranging requests over the second upstream transmit interface;

wherein the transmit windows included in the first bandwidth allocation messages are spaced based on receipt of the second ranging requests from the second upstream transmit interface, and wherein the transmit windows included in the second bandwidth allocation messages are spaced based on receipt of the first ranging requests from the first upstream transmit interface.

21. The memory device of claim 20, wherein execution of the instructions causes the processing device to perform operations further comprising:

timing-out one of a plurality of upstream transmit interfaces on the cable modem in response to observing a predetermined number of consecutive ranging failures for the timed-out interface; and providing the remaining active upstream transmit interfaces on the cable modem with unscheduled ranging opportunities in association with the interface timeout.

22. The memory device of claim 21, wherein execution of the instructions causes the processing device to perform operations further comprising taking the cable modem offline prior to timing-out all of the active upstream transmit interfaces if all the remaining active upstream transmit interfaces fail to send ranging requests in response to the unscheduled ranging opportunities.

* * * * *